G. KRENZLER.
LACE MAKING MACHINE.
APPLICATION FILED SEPT. 17, 1907.

934,324.

Patented Sept. 14, 1909.
4 SHEETS—SHEET 1.

G. KRENZLER.
LACE MAKING MACHINE.
APPLICATION FILED SEPT. 17, 1907.

934,324.

Patented Sept. 14, 1909.
4 SHEETS—SHEET 2.

Witnesses:

Inventor:

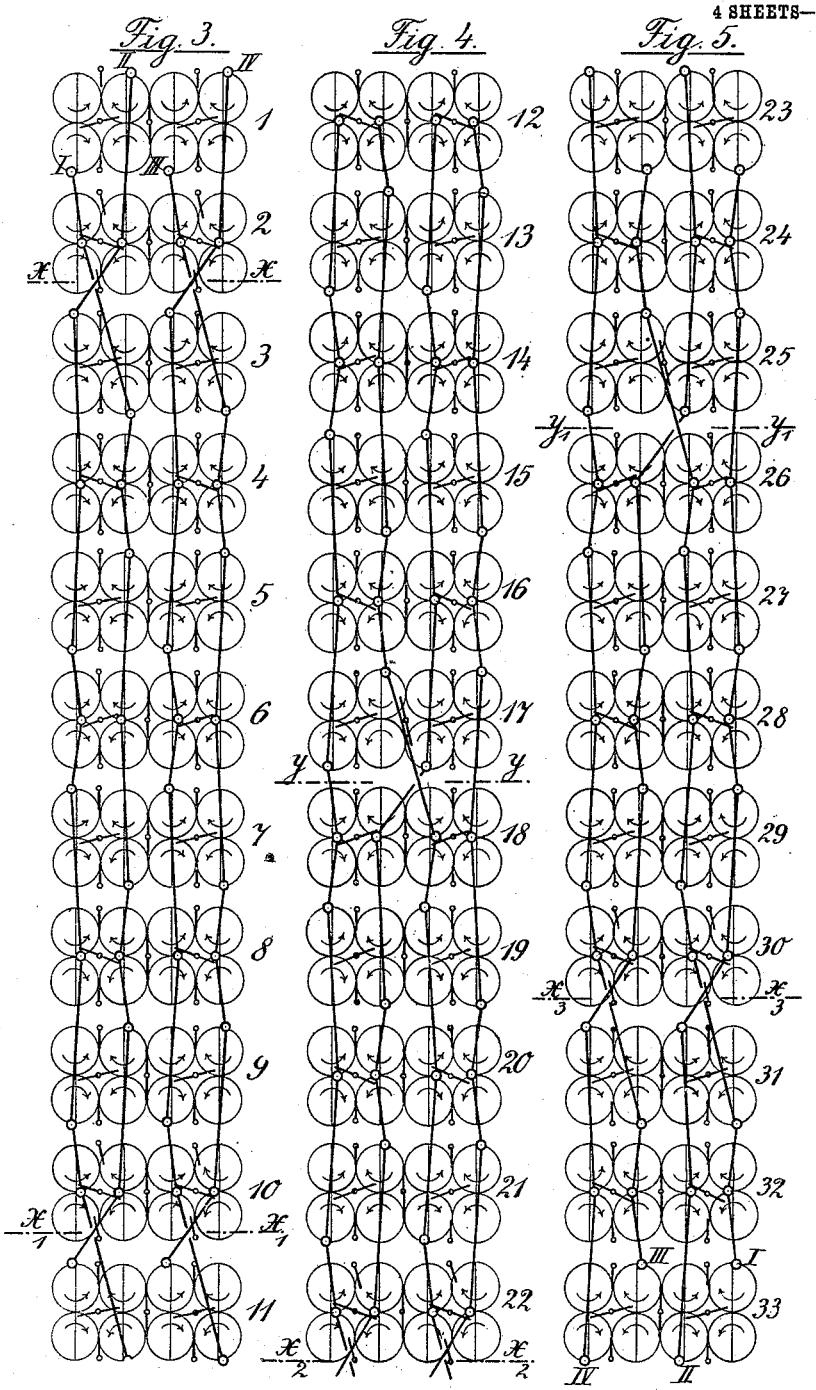

G. KRENZLER.
LACE MAKING MACHINE.
APPLICATION FILED SEPT. 17, 1907.

934,324.

Patented Sept. 14, 1909.
4 SHEETS—SHEET 4.

Witnesses:

Inventor:
Gustav Krenzler

UNITED STATES PATENT OFFICE.

GUSTAV KRENZLER, OF BARMEN, GERMANY.

LACE-MAKING MACHINE.

934,324.

Specification of Letters Patent. Patented Sept. 14, 1909.

Application filed September 17, 1907. Serial No. 393,266.

*To all whom it may concern:*

Be it known that I, GUSTAV KRENZLER, a subject of the Emperor of Germany, residing at Barmen, Untere Besenbruchstrasse 20$^A$, in the Province of Rhenish, Prussia, and State of Germany, have invented new and useful Improvements in or Relating to Lace-Making Machines, of which the following is a specification.
This invention relates to a braiding machine for making torchon net and the machine comprises two races circularly arranged about a common center. The entire train or circuit of circular races may, for purposes of description, be conveniently considered as divided into units or component parts of the whole train, each unit forming what may be called a partial train. Each unit comprises four disks or two disk pairs, two of the disks being in one of the concentric circles and two in the other or parallel circle, and each disk pair has one of its disks in one circle and the other disk in the other circle. Each such disk pair is provided with one bobbin, and in each unit of four disks there are two bobbins. These units form two concentric circles.

In addition to the reduction of diameter of the machine the present invention has for its object to easily and simply determine the perforations of a set of cards required to produce a given pattern of lace for the jacquard mechanism. For this purpose, each unit is provided with longitudinally arranged tongue switches and radially arranged intermediate tongue switches. Each unit is further provided with two oppositely located radially arranged exterior switches.

A machine embodying this invention and also the operation of the machine are set forth in the following specification and claims and illustrated in the annexed drawings, in which:—

Figure 1:
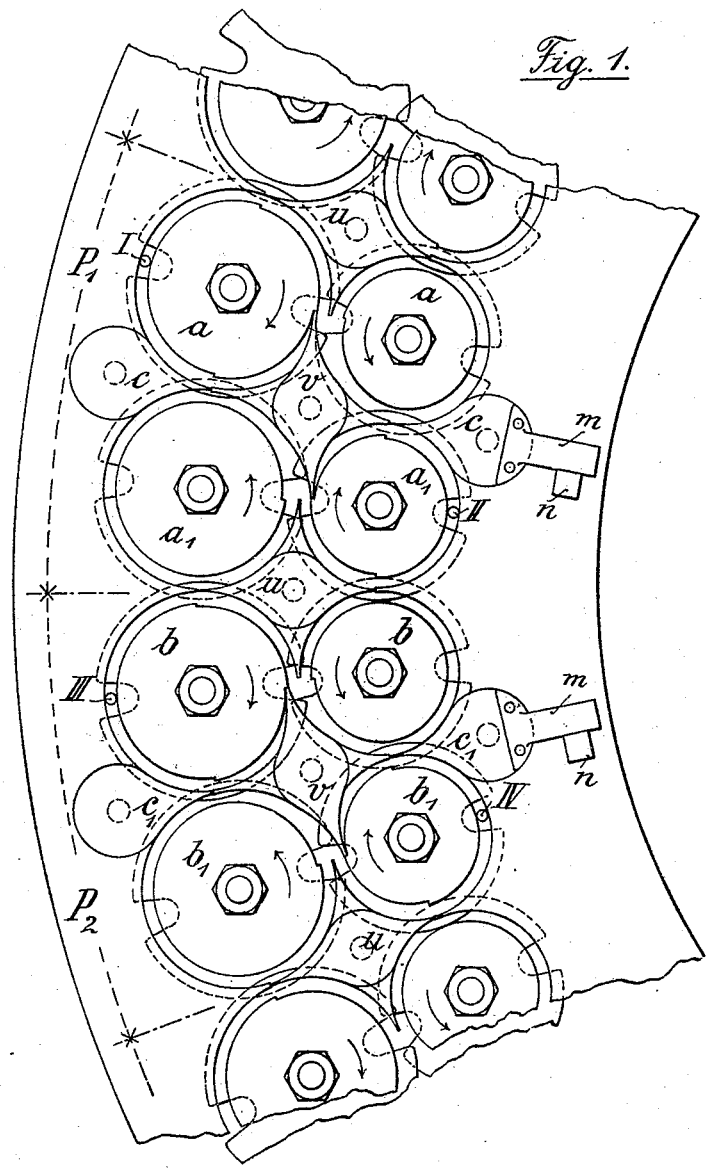
Figure 2:
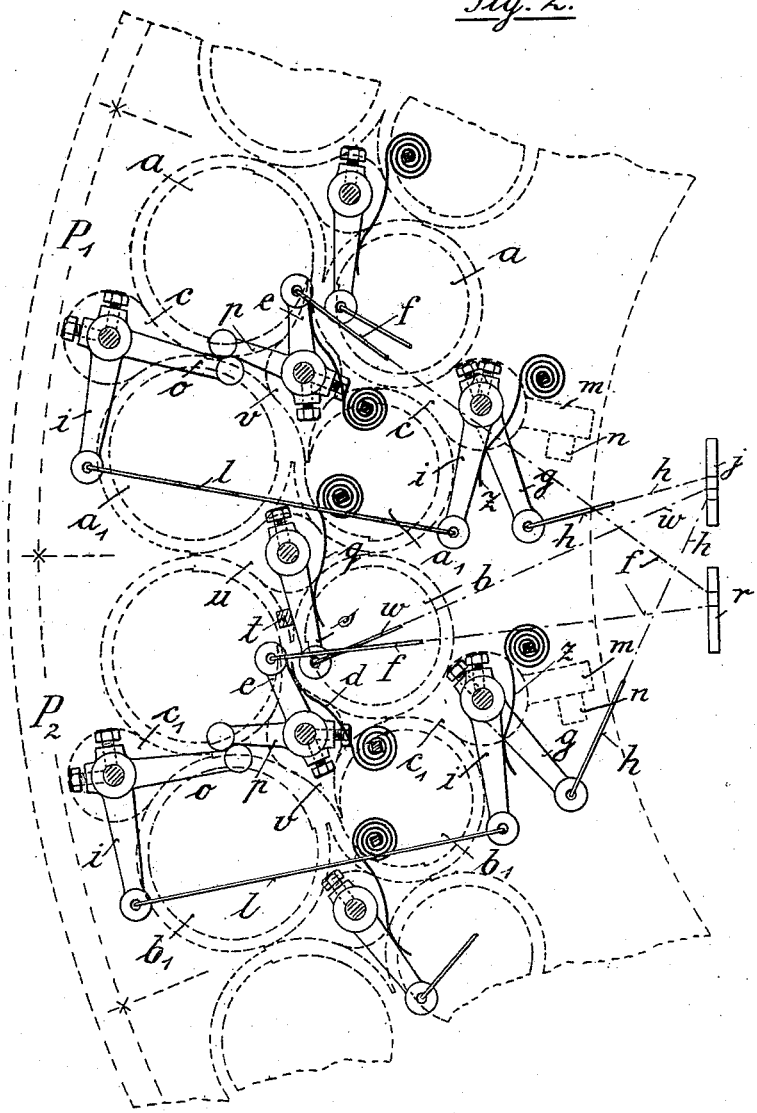
Figure 6:
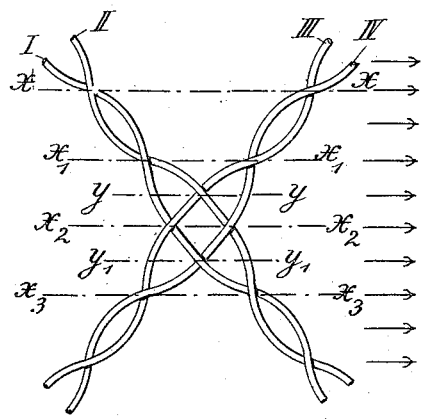
Figure 7:
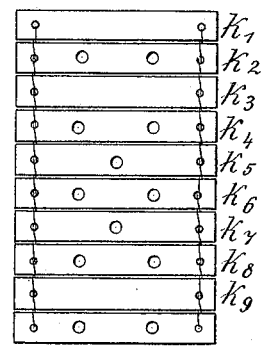

Figure 1 is a plan view of a portion of a braiding machine for making torchon net constructed according to this invention. Fig. 2 is a horizontal cross section made directly underneath the bottom plate, the upper plate with the bobbin guiding device being shown in dotted lines. Figs. 3, 4 and 5 show diagrammatically the plaiting process for a simple plaited product. Fig. 6 shows such product. Fig. 7 shows a series of cards of the jacquard pattern gear.
In the drawings the letters P' and P$^2$ (Figs. 1 and 2) indicate a partial train or a unit of the whole train which is composed of two disk-pairs $a$ $a$, $a'$ $a'$, $b$ $b$, $b'$ $b'$. These disks are so arranged that their centers form the corners of a square and for convenience of description two disk pairs, for instance $a$ $a$, and $a'$ $a'$ or $b$ $b$, and $b'$ $b'$, will hereinafter be referred to as a partial train square. These partial train squares with their driving wheels when the entire machine is assembled will form two concentric circles as is well known.

In the center of each partial train square or group of four disks is arranged the oscillating switch $v$. This switch $v$ is placed longitudinally along and parallel to the circumference of the wheel circles. These switches $v$ are intended to guide the bobbins I II (III IV) respectively belonging to each pair of disks. Between each disk pair are switches $c$ $c$, $c'$ $c'$, which I will hereinafter term radial exterior switches. These switches $c$ $c$ and $c'$ $c'$ are located opposite to each other and occupy a central position when at rest (Fig. 1) so that in such position each switch $c$ $c$ and $c'$ $c'$ leaves the bobbin track open for each disk-pair. Volkenborn oscillating switches $u$ form the connection between the partial train squares P' and P$^2$. These switches $u$ will be hereinafter referred to as radial intermediate switches and also occupy a central position when at rest as seen in Fig. 1. In this position of rest the radial intermediate switches $u$ limit the movement of the bobbins to the respective disk-pair, that is, prevent the transfer of the bobbins from one partial train to another. The longitudinal switches $v$ are uniformly and simultaneously oscillated or moved to and fro between the disk pairs $a$ $a$, $a'$ $a'$ or $b$ $b$, $b'$ $b'$ while the switches $c$ $c$ and $c'$ $c'$ maintain a central position. This oscillation will cause the bobbins I II (III IV) to describe an 8-shaped path on the respective disk-pairs. Each disk pair is provided with one bobbin and during such travel of the bobbin the bobbin threads are not plaited but they maintain their natural degree of twist.

Secured to the spindle of the longitudinal switch $v$ is an arm $e$, Fig. 2. Spring $d$ acting on this arm $e$ will force the switch $v$ into the position shown in Fig. 1. At $f$ (Fig. 2) is shown a rod which at one of its ends engages the arm $e$. The other end of said rod $f$ is in engagement with the jacquard mechanism shown diagrammatically in Fig. 2 at $r$.

Now when the needles of the jacquard mechanism are raised and lowered they will cause the rod $f$ to pull the arm $e$, thus setting the longitudinal switch $v$ to a position reverse to that shown in Fig. 1, thus obtaining the oscillating movement of the longitudinal switch $v$ hereinbefore described.

To the spindle of the radial exterior switch $c$ located at the inner row or circle of wheels is secured an arm $g$. This arm $g$ is moved through the intermediary of rod $h$ in engagement at one of its ends to the arm $g$ and at its other end to jacquard pattern gear shown at $j$, Fig. 2. The radial exterior switches $c$ are connected together by means of arms $i$ secured one to each spindle of such switches and rod $l$ connecting the said arms $i$. At $m$ is shown an arm on the radial exterior switch $c$ which arm $m$ abuts against fixed pin or stop $n$. The arm $m$ is held against pin $n$ by means of spring $z$ pressing against arm $i$, thus holding the switches $c$ in a central position. From the foregoing arrangement it will thus be understood that when pattern gear $j$ acts on rod $h$ and arm $g$ to set both radial exterior switches $c$ by means of arms $i$ and rod $l$ the bobbin of one disk-pair of a partial train is transferred to the other disk-pair thus producing single twisted strand by the motion of the two bobbins traversing in succession parts of the four circuits of the train squares in the same direction.

On the spindle of radial exterior switch $c$ on the outer circle of wheels is secured an arm $o$ which abuts against arm $p$ on the spindle of the longitudinal switch $v$. Thus the oscillation of switch $c$ will be transmitted to longitudinal switch $v$ so that the said longitudinal switch $v$ will be set simultaneously with radial exterior switches $c$.

The radial intermediate switch $u$ controlling the passage of the bobbins from one to the other partial train square is held in its central position (Fig. 1) by spring $q$. The movement of the switch is limited by fixed pin $t$ against which arm $s$ is forced by the aforementioned spring $q$. The shifting or oscillation of the radial intermediate switch $u$ is effected by means of rod $w$ leading to the jacquard pattern gear $j$.

On examining Figs 3 to 7 it will be seen how the above described arrangement and construction of the bobbin guide devices can be used for manufacturing double thread lace equivalent to the hand-made pillow lace and how the perforations of the jacquard cards can be determined in a simple manner for any lace pattern.

Each single diagram 1—33 of Figs. 3–5 indicates two partial trains on which are traveling the bobbins I to IV guided by the radial intermediate, radial exterior and longitudinal switches indicated by lines. The driving wheels are provided with two blades, and each diagram shows the position of bobbins half a revolution in advance of that in the preceding diagram.

If the bobbins of the same number are connected by lines from the first to the last diagram, it will be found that they produce the plaited work shown in Fig. 6. The example illustrated, consists of two plaited strands between which are produced crossbindings of the pairs of threads, characteristic of the pillow lace work; and the plaited work indicated in the diagrams by connecting lines corresponds to that in Fig. 6 in which it is merely shown in compressed state.

Before arriving at the position 1 in the diagram the bobbins on the corresponding disk-pairs of each partial train have described an 8-shaped path (no plaiting being produced) owing to the corresponding to and fro oscillation of the radial intermediate switch $v$ brought about by the device $r$ by means of rods $f$ and arms $e$ (Fig. 2). The radial exterior switches $c\,c$, $c'\,c'$ and the radial intermediate switches $u$ remain in the position of rest, the corresponding hooks of the jacquard pattern gear being forced back, that is to say out of reach of the blades raising them, at each revolution of the card prism. The wires connected to the hooks are, therefore, forced back by the non-perforated cards. In the card-band shown in Fig. 7 the upper card $k^1$ is the last non-perforated card which brings about the position of the switches shown in the diagram 1. The position 2 in the diagram shows the longitudinal switches $v$ and switches $c$ shifted so as to result in a mutual passage of the bobbins I, II or III, IV from one to the other disk-pairs and in a plaiting being effected at $x$—$x$. The hooks of the switches $c\,c$ and $c'\,c'$ had, therefore, to remain in its forward or blade-engaging position, and to be raised by the blade. The next card $k^2$ of the card band must, therefore, have two perforations. The switches $c$ are connected to one another by links $l$ and arms $i$ and one of said switches is connected by arms $g$ and $h$ to the pattern gear $j$. These switches return at 3 in the diagram to the central position, while the longitudinal switches $v$ by means of rods $f$ and arms $e$ connected to the jacquard mechanism $r$, execute the regular oscillation for the 8-shaped path of the bobbins, for which in this case in the card-band follows the non-perforated card $k^3$ which leaves the switches $c$ by means of rods $h$ and $l$ in the central position and the longitudinal switches $v$ by means of rods $f$ and arms $e$ unaffected up to the position 9 in the diagram. In order to obtain further plaiting at $x'\,x''$ in the single strands, the radial exterior switches $c$ and the longitudinal switches $v$ are again shifted in accordance with the next following card $k^4$ provided with two holes, so that they are brought into the position shown at 10 in the diagram, and it will be seen that for the continuous manufacture of separate plaited strands, a solid card and a card with two perforations must alternately follow each other. If, however, it is desired to produce the cross binding $y$ $y$ (as at 17 in the diagram) between the single plaits, this is effected by the shifting of the radial intermediate switch $u$ by means of a hook especially provided for the same, for which purpose the card $k^5$ with one perforation is inserted into the band. At 18 in the diagram the radial intermediate switch $u$ by means of rod $w$ connected to the jacquard pattern gear $j$ has returned to the position of rest, and at 22 the card $k^6$ with two perforations has moved the radial exterior switches $c$ $c$ $c'$ $c'$ by means of rods $h$ and $l$ and the two longitudinal switches $v$ by means of rods $f$ and arms $e$ whereby the plaits $x^2$ $x^2$ have been produced.

At 25 the next card $k^7$ with one perforation brings about the movement of the radial intermediate switch $u$ by means of rod $w$ and arms $s$ for producing the binding $y^1$ $y^1$, at 26 the central position of the radial intermediate switch $u$ is again brought about, and at 30, for the purpose of obtaining the plaits $x^3$ $x^3$, the radial exterior switches $c$ $c$ and the radial intermediate switches are correspondingly adjusted by means of the card $k^8$ provided with two holes. In this way a complete cross-binding is obtained. If thereupon a non-perforated card and a card with two holes $k^9$ $k^{10}$ follow in regular alternate sequence, single strands will be continuously produced, while a continual alternation of cards with two holes and of cards with one hole would result in the production of consecutive cross-bindings or of a uniformly thick plait. It follows, therefore, as shown also in the separate view in Figs. 6 and 7, that one card perforation corresponds to each plait or cross-binding, while the non-perforated cards bring about the movement in an 8-shaped path of the bobbins on the disk-pairs. The perforations which must be made in the card band to produce a lace pattern can be easily determined from the pattern after drawing it up in the usual manner. The perforations of a card must correspond in number and distance to the plaits or crossings which lie next to each other in a straight line drawn through the plaits or bindings in the work.

Now what I claim is:

1. A lace-making machine for torchon net comprising partial train squares each consisting of two disk-pairs, one bobbin for each disk-pair, longitudinal switches and radial exterior switches suitably connected to coact for guiding the bobbin from one disk-pair to the other and radial intermediate switches for transferring the bobbins from one partial train to another, said switches occupying a central position when at rest, said longitudinal switches being each formed of one piece with its extreme pointed portions extended in opposite directions.

2. A lace-making machine for torchon net comprising partial train squares each consisting of two disk-pairs, one bobbin for each disk-pair, longitudinal switches and radial exterior switches suitably connected to coact for guiding the bobbin from one disk-pair to the other and radial intermediate switches for transferring the bobbins from one partial train to another, said longitudinal switches being each made of one piece with oppositely facing points and the said partial trains forming two concentric circles of wheels.

3. A lace-making machine for torchon net comprising partial train squares each consisting of two disk-pairs, one bobbin for each disk-pair, longitudinal switches and radial exterior switches connected to one another by link and lever connections for guiding the bobbin from one disk-pair to the other, radial intermediate switches for transferring the bobbins from one partial train to another, jacquard mechanism and pattern gears with means connected to the jacquard mechanism for oscillating the switches, said means comprising arms, springs acting on the arms and rods connecting the arms and pattern gears.

In testimony whereof I have hereunto set my hand in the presence of two subscribing witnesses.

GUSTAV KRENZLER. [L. S.]

Witnesses:
 R. SCHMIDT,
 R. F. SPALDING.